US006236760B1

(12) United States Patent
Bagni et al.

(10) Patent No.: US 6,236,760 B1
(45) Date of Patent: May 22, 2001

(54) VIDEO CODING METHOD AND DEVICE, AND CORRESPONDING DECODING DEVICE

(75) Inventors: Daniele Bagni, Olgiate Molgora; Stefano Tono, Ponte S. Nicolo, both of (IT)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/116,679

(22) Filed: Jul. 16, 1998

(30) Foreign Application Priority Data

Jul. 16, 1997 (EP) .................................................. 97401719

(51) Int. Cl.$^7$ ...................................................... G06K 9/36
(52) U.S. Cl. .......................... 382/248; 382/236; 382/238; 375/240.13; 375/240.21; 386/111
(58) Field of Search .......................... 382/248, 250–251, 382/245–246, 232, 236, 238; 348/403, 411–416, 384, 699–700, 714; 386/111, 109, 112, 33, 27; 375/240.16, 240.03, 240.18, 240.15, 240.21, 240.13, 240.11

(56) References Cited

U.S. PATENT DOCUMENTS

| 5,717,816 | 2/1998 | Boyce et al. ......................... 386/111 |
| 5,777,677 * | 7/1998 | Linzer ............................... 375/240.11 |
| 6,028,635 * | 2/2000 | Owen et al. ......................... 348/403 |
| 6,104,434 * | 8/2000 | Nakagawa et al. ................... 348/403 |

FOREIGN PATENT DOCUMENTS

| 0631441A2 | 12/1994 | (EP) ................................. H04N/7/13 |
| 9613128A1 | 5/1996 | (WO) ............................... H04N/9/79 |

OTHER PUBLICATIONS

"ITU Standardisation of Very Low Bitrate Video Coding Algorithms", by K. Rijkse, Signal Processing: Image Communication, No. 7, 1995, pp. 553–565.

* cited by examiner

Primary Examiner—Jose L. Couso
Assistant Examiner—Ishrat Sherali
(74) Attorney, Agent, or Firm—Russell Gross

(57) ABSTRACT

The invention relates to a low/very low bitrate video coding method fully compatible with the H.263 standard includes a first forward coding step, a second backwards prediction step, and a third decision step including a selection sub-step between intra and inter coding modes. This decision step controls in the intra coding mode a down-conversion filtering sub-step, carried out at the beginning of the coding step and allowing to code and transmit original intra pictures with a lower resolution, and a corresponding up-conversion filtering sub-step, carried out in the prediction step. In the receiving terminal, the decoder recognizes the reduced format of the pictures and up-scales them.

4 Claims, 2 Drawing Sheets

VIDEO CODING METHOD AND DEVICE, AND CORRESPONDING DECODING DEVICE

FIELD OF THE INVENTION

The present invention relates to a video coding method comprising:
- a first coding step including in series at least an orthogonal transform sub-step, a quantization sub-step, and a variable length coding sub-step;
- a second prediction step including in series, between the output of said quantization sub-step and the input of the coding step, at least an inverse quantization sub-step, an inverse orthogonal transform sub-step, and a prediction sub-step;
- a third decision step including a selection sub-step between so-called intra and inter coding modes. It also relates to a corresponding video coding device, to a coded video signal such as available at the output of such a coding device, to a storage medium for memorizing said signal, and to a corresponding decoding device. This invention may be used in the field of videophony and video conferencing.

BACKGROUND OF THE INVENTION

The standard H.263 for very low bitrate video coding, described for instance in "ITU standardisation of very low bitrate video coding algorithms", K. Rijkse, Signal Processing: Image Communication, 7(1995), pp.553–565, is based on a hybrid video coding method dealing with macroblock structured pictures and using techniques such as DCT (Discrete Cosine Transform), to reduce the spatial redundancy, motion estimation and interpicture prediction, to reduce spatial redundancy, and finally quantization variable length entropy coding (as also provided in the case of the MPEG-2 standard).

The maximum bitrate for this standard H.263 is about 20 kbits/s for videophone and an integer multiple of 64 kbits/s (such as 64, 128, 256, . . . ) for video conference. At these very low bitrates, various kinds of solution are often used in order to reduce the transmitted bitrate, for instance a temporal sub-sampling. These solutions must however be implemented without degrading the picture quality.

A block diagram of the standard H.263 encoder is shown in FIG. 1. The input bitstream IB corresponding to the images to be coded is received by the first positive input of a subtracter 11. This subtracter is followed in series by an orthogonal transform device such as a DCT circuit 12, a quantizer 13 (Q), a variable length coding (VLC) circuit 14, a video multiplexer 15 (MUX), and an output buffer 16 that yields an output bitstream OB. An interpicture prediction loop, provided between the output of the quantizer 13 and the second negative input of the subtracter 11 comprises in series an inverse quantizer 17 ($Q^{-1}$), an inverse DCT circuit 18 ($DCT^{-1}$), an adder 19, a prediction circuit 20, the output of which is also sent back to the second input of the adder 19 for the reconstitution of a complete image at the output of said adder, and the subtracter 11.

The output of the adder 19 is sent to a motion estimator 21 that also receives the input bitstream IB and yields motion vectors MV. These vectors are then coded by a second VLC circuit 22 and sent to the multiplexer 15 for transmission (or storage). A decision circuit 23 provided between the output buffer 16 and the prediction circuit 20 allows to choose between an intra coding mode, concerning only the first picture of the video sequence, which is then coded without temporal prediction, and an inter coding mode, according to which all the remaining pictures are coded using prediction.

As the intra pictures are coded without any reference to any previous picture, each of them needs from 4 to 10 times (depending on the scene content and on the average quantization parameter) the amounts of bits necessary to code the subsequent pictures in inter mode. The following table (=Table 1) illustrates, for some well known test sequences in CIF format (288 lines of 352 pixels), the difference in terms of bits between intra and inter modes:

| CIF sequences | intra mode | inter mode |
| --- | --- | --- |
| Miss America | 35568 | 3936 |
| Claire | 37224 | 3496 |
| Renata | 149984 | 34736 |
| Flower Garden | 180456 | 63512 |
| Foreman | 67736 | 13016 |
| Teeny | 67344 | 38968 |
| Interview | 106320 | 11272 |

The values of these amounts of bits necessary to code the first picture in intra mode and the second subsequent picture in inter mode lead to observe that the output buffer 16, necessary to transmit the output stream OB at constant bitrate, is strongly used during the intra coding. A buffer with a proper capacity might be used in order to store an intra picture without any risk of overflow, but the delay of the encoder is directly proportional to the total bit number of the first intra picture: the larger the number of bits of this picture, the larger the delay to empty the output buffer at the concerned constant target bitrate.

SUMMARY OF THE INVENTION

It is therefore an object of the invention to propose a coding method allowing to avoid any risk of overflow when coding according to the intra mode.

To this end the invention relates to a coding method as described in the preamble of the description and characterized in that said third decision step also includes, only in said intra coding mode, a down-conversion filtering sub-step, carried out at the beginning of the coding step, and a corresponding up-conversion filtering sub-step, carried out in the prediction step, just before the prediction sub-step itself, said down-conversion allowing to code pictures with a reduced picture format with respect to the format of the pictures coded according to the inter coding mode.

The introduction of these additional steps constitutes a very simple and effective solution to save bits, with an average computational reduction of about 30% and a decreased encoding delay because of the less bit occupation of the output buffer (and of said reduced computational effort). Although not standardized, this solution is compatible with the standard H.263. Tests have been performed in the range of 64–256 kbits/sec. target bitrates, with 5 Hz picture rate and CIF format, and with either a very simple buffer control strategy or a very complex one (based on a pre-analysis), and show that the solution is efficient, without noticeable degradation of the final quality. Moreover, said solution is totally scalable, even if particularly adapted to low bitrate applications (less than or equal to 256 kbits/sec.) for which the requirements of high compression ratios and acceptable quality are more difficult to achieve.

BRIEF DESCRIPTION OF THE DRAWINGS

The particularities and advantages of the invention will become more apparent from the following description and the accompanying drawings, in which.

DESCRIPTION OF PREFERRED EMBODIMENTS

Figure 1:
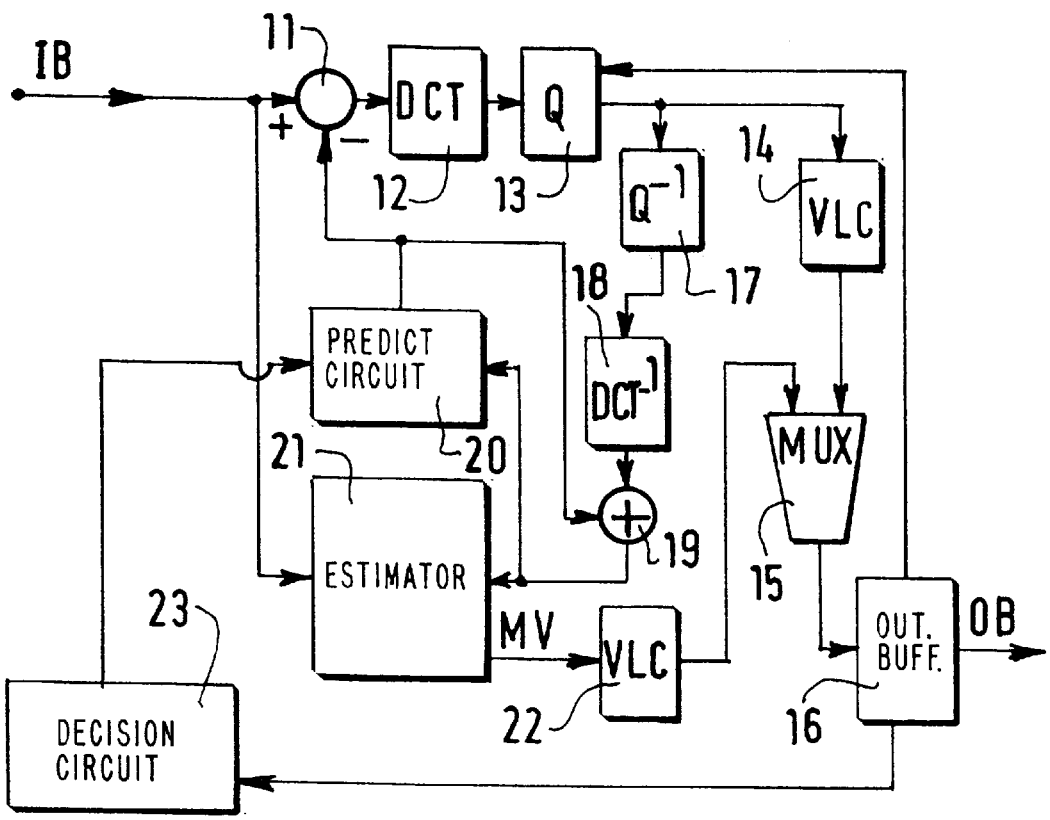
FIG. 1 shows, as already said, a block diagram of the standard H.263 encoder.
Figure 2:
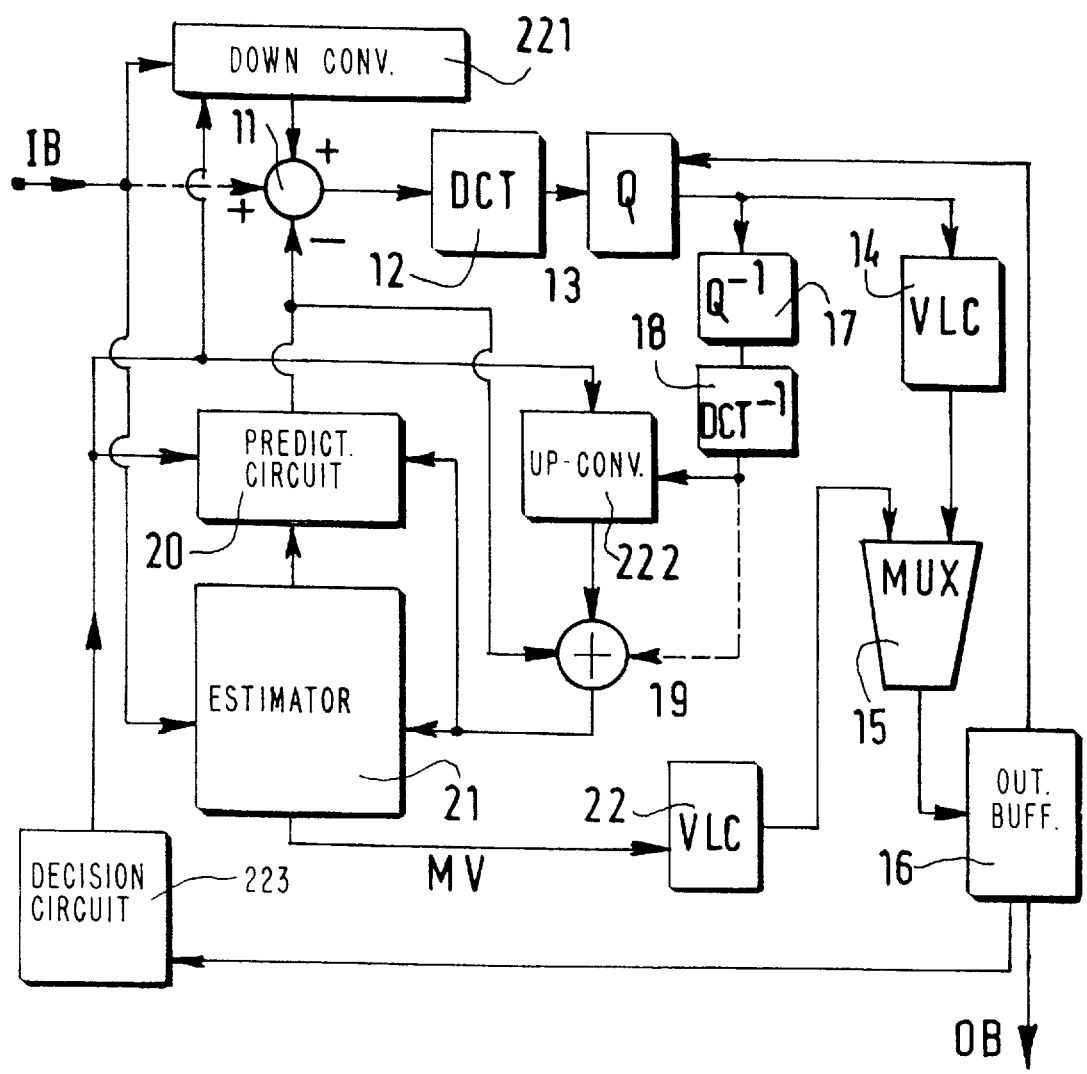
FIG. 2 shows a block diagram of an encoder according to the invention, and FIG. 3 a corresponding decoding device.

The principle of this invention is the following. Instead of coding the first picture of the sequence in a given format, for instance in CIF format, according to the intra mode, and then transmitting it after quantization and entropy coding steps, this original picture is spatially down-converted to a lower resolution, for instance to QCIF resolution (144 lines of 176 pixels) in a down-converter 221 that, as illustrated in FIG. 2 showing an encoder according to the invention (the identical circuits have the same references as in FIG. 1), is connected to the input IB of the encoder. The output of said down-converter 221 is sent towards the subtracter 11 and constitutes its positive input (in place of the direct input IB in the other cases, i.e. when pictures are not coded according to the intra mode). Said converter is for instance a half-band bidimensional filter with 15 taps and odd symmetry, but, in order to save computational efforts, a filter with a lower number of taps (for instance seven) may also be used, obtaining practically the same quality. Whatever this filtering step, this down-converted picture (in QCIF format) will be coded according to the intra mode and then transmitted in the output bitstream.

In the encoder, the QCIF picture present at the output of the inverse DCT circuit 18 of the prediction loop is spatially up-converted to CIF format in an up-converter 222, in order to be used to predict the following pictures of the sequence. The output of said up-converter 222 is sent towards the adder 19 and constitutes its first input (in place of the direct connection between the circuit 18 and the first input of said adder as shown in FIG. 1).

A decision circuit 223, provided as previously between the output buffer 16 and the prediction circuit 20, allows first to choose (as previously) between the intra mode and the inter mode and secondly to replace on the positive input of the subtracter 11, only in intra mode, the direct connection coming from the encoder input by a connection coming from the output of the down-converter 221, and, on the input of the adder 19, the connection coming directly from the inverse DCT circuit 18 by a connection coming from the output of the up-converter 222.

The output bitstream OB is therefore composed, according to the invention, of a stream of data corresponding to QCIF pictures for the pictures coded in intra mode and to CIF pictures for pictures not coded in intra mode. To said intra and inter coded data, an additional information is associated for indicating the selected coding mode of the data (i.e. which data have been coded with a reduced picture format and which data have been coded according to the inter coding mode), as recommended by the H.263 standard, in the specification of its bitstream syntax. This output bitstream may be stored, or transmitted either in order to be memorized in a storage medium provided to this end or in order to be decoded.

Figure 3:
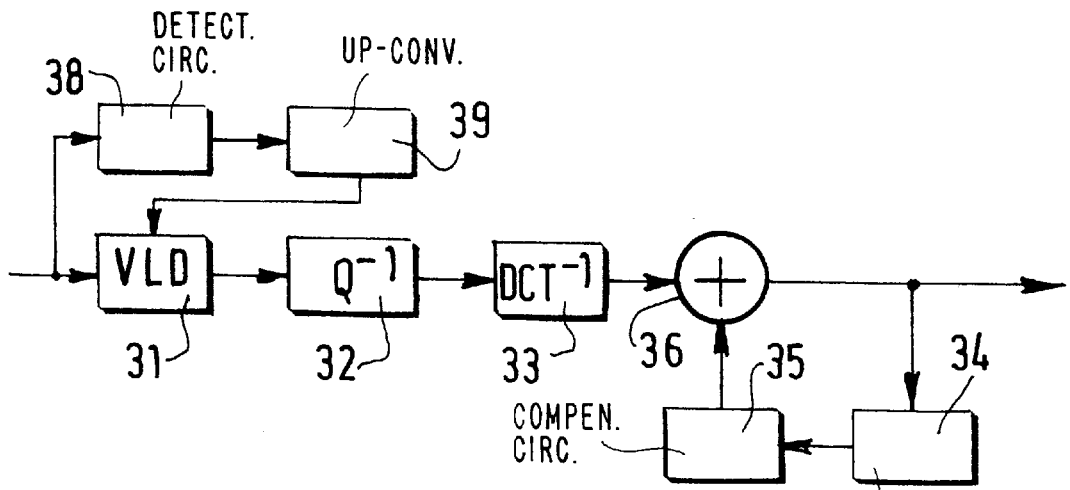

A decoding device, provided to this end and shown in FIG. 3, comprises a first decoding channel including in series a variable length decoding circuit 31, an inverse quantizing circuit 32 and an inverse discrete cosine transform circuit 33, followed by a second motion compensation channel including a picture memory 34, a motion compensation circuit 35, and an adder 36 receiving the outputs of said inverse discrete cosine transform circuit 33 and motion compensation circuit 35. The output of the adder 36 is both the output of the decoding device and the input of the picture memory 34. When the decoding device recognizes, thanks to a detecting circuit 38, the intra coding mode associated to the pictures coded according to the reduced picture format (QCIF in the described example), it performs in an up-converter 39 a spatial up-conversion from said reduced format to the original one (CIF in the described example), the direct connection between the input of the decoding device and the circuit 31 being then replaced by the connection between the output of the up-converter 39 and the input of said circuit 31.

The tests that have been carried out show that, although the quality of the coded intra pictures is less than the quality of the original pictures, when displaying in real time the whole video sequence, the degradation of this quality is masked by the subsequent better quality of the other pictures coded in inter mode. After few inter pictures (generally four or five), it is practically no longer possible to distinguish between the original sequence and the sequence processed according to the invention. The same behaviour can be objectively demonstrated by PSNR (Peak Signal to Noise Ratio) and MSE (Mean Square Error) luminance measurements for some of the above indicated test sequences:

|  | Original encoder | | INTRA down-up encoder | |
| --- | --- | --- | --- | --- |
| num.picture | SNR | MSE | SNR | MSE |
| 1 (INTRA) | 34.90 | 21.04 | 27.69 | 110.73 |
| 2 (P-INTER) | 32.33 | 38.00 | 32.18 | 39.39 |
| 3 | 30.44 | 58.78 | 30.30 | 60.72 |
| 4 | 30.77 | 54.45 | 30.65 | 55.98 |
| 5 | 31.80 | 43.01 | 31.70 | 43.96 |
| 6 | 31.04 | 51.15 | 30.95 | 52.26 |
| 7 | 30.56 | 57.14 | 30.53 | 57.60 |
| 8 | 29.29 | 76.63 | 29.23 | 77.65 |
| 9 | 28.88 | 84.06 | 28.87 | 84.36 |
| 10 | 28.36 | 94.85 | 28.33 | 95.56 |
| 11 | 29.20 | 78.17 | 29.20 | 78.24 |
| SNR and MSE luminance measurements, in Teeny. | | | | |
| 1 (INTRA) | 34.07 | 25.45 | 28.61 | 89.57 |
| 2 (P-INTER) | 32.33 | 37.70 | 31.21 | 49.19 |
| 3 | 32.26 | 38.68 | 31.58 | 45.16 |
| 4 | 31.98 | 41.22 | 31.50 | 46.03 |
| 5 | 32.06 | 40.49 | 31.70 | 43.98 |
| 6 | 31.76 | 43.39 | 31.54 | 45.65 |
| 7 | 31.93 | 41.67 | 31.77 | 43.24 |
| 8 | 31.89 | 42.07 | 31.79 | 43.08 |
| 9 | 31.78 | 43.20 | 31.72 | 43.74 |
| 10 | 31.91 | 41.89 | 31.86 | 42.40 |
| 11 | 32.04 | 40.62 | 32.03 | 40.78 |
| SNR and MSE luminance measurements, in Foreman. | | | | |
| 1 (INTRA) | 30.75 | 54.73 | 22.92 | 332.25 |
| 2 (P-INTER) | 27.97 | 103.85 | 27.03 | 128.88 |
| 3 | 27.54 | 114.67 | 27.00 | 129.61 |
| 4 | 27.10 | 126.83 | 26.82 | 135.32 |
| 5 | 26.74 | 137.85 | 26.56 | 143.47 |
| 6 | 26.26 | 153.87 | 26.19 | 156.31 |
| 7 | 26.02 | 162.58 | 25.97 | 164.46 |
| 8 | 25.98 | 163.93 | 25.94 | 165.70 |
| 9 | 25.79 | 171.48 | 25.74 | 173.26 |
| 10 | 25.64 | 177.62 | 25.55 | 180.99 |
| 11 | 25.24 | 194.50 | 25.17 | 197.81 |

SNR and MSE luminance measurements, for Renata. (the concerned test sequence is mentioned under the corresponding table).

Examples are given hereunder of some results of said tests (in numbers of bits), for the same sequences "Teeny", "Foreman" and "Renata":

|  | original intra | reduced intra |
|---|---|---|
| (a) "Teeny" | | |
| picture I | 67344 | 23984 |
| picture P | 38968 | 46112 |
| picture P | 28928 | 28720 |
| picture P | 19440 | 19552 |
| picture P | 34872 | 34960 |
| total amount: | 189552 | 153328 |
| (b) "Foreman" | | |
| picture I | 67736 | 25480 |
| picture P | 13016 | 22176 |
| picture P | 9152 | 11928 |
| picture P | 9552 | 10880 |
| picture P | 10952 | 11408 |
| total amount: | 110408 | 81872 |
| (c) "Renata" | | |
| picture I | 149984 | 35472 |
| picture P | 34736 | 72552 |
| picture P | 28112 | 31784 |
| picture P | 28376 | 30192 |
| picture P | 26280 | 27504 |
| total amount: | 267488 | 197504 |

These tables indicate comparisons between the total number of bits necessary to code the initial five pictures of every sequence (for the remaining pictures that follow these ones, the amount of bits is almost equal), and show that a remarkable amount of bits is saved during these first pictures. Moreover, as the H.263 video coding standard can operate on five picture formats (sub-QCIF=96 lines of 128 pixels; QCIF; CIF; 4CIF=576 lines of 704 pixels; 16 CIF= 1152 lines of 1408 pixels), the invention can also be applied with the same results and benefits to the 16CIF (with down-conversion to 4CIF), to the 4CIF (down-conversion to CIF), and so on, according to its completely scalable feature. In the case of 20 kbit/s videophony with QCIF pictures, sub-QCIF sizes are not properly half the dimensions of QCIF (in fact one has 128 pixels and 96 lines instead of 88 and 72). Down-converting from QCIF to sub-QCIF, before intra coding, would not produce the same "bit saving and lower delay" effect than in the other higher resolution cases. It is then proposed to use "half-QCIF" instead of sub-QCIF format. The "half-QCIF" sizes are 88 pixels and 72 lines and again this format can be obtained by the same 15 taps bi-dimensional filter. As it is not a standard format, the two concerned intra down-up terminals can signal the half-QCIF as it was a "normal" sub-QCIF, in other words: once the intra down-up feature is recognized and used by the two terminals working at QCIF resolution, when the decoder reads from the intra header the sub-QCIF source format declaration, it recognizes to be in front of a half-QCIF picture and it performs a spatial up-conversion from half-QCIF to QCIF size after the inverse DCT calculation.

What is claimed is:

1. A video coding method, comprising:
   a first coding step including in series at least an orthogonal transform sub-step, a quantization sub-step, and a variable length coding sub-step;
   a second prediction step including in series, between the output of said quantization sub-step and the input of the coding step, at least an inverse quantization sub-step, an inverse orthogonal transform sub-step, and a prediction sub-step;
   a third decision step including a selection sub-step for selecting between an intra coding mode and an inter coding mode;
   wherein said third decision step also includes, only in said intra-coding mode, a down-conversion sub-step, carried out at the beginning of the coding step, and a corresponding up-conversion sub-step, carried out in the prediction step, just before the prediction sub-step, said down conversion sub-step converting pictures to a reduced resolution with respect to the format of the pictures coded according to the inter coding mode.

2. A video coding method according to claim 1, wherein said reduced picture format is the format QCIF of 176 pixels×144 lines, the format in inter coding mode being the format CIF of 352 pixels×288 lines.

3. A video coding device, comprising:
   a first coding channel including in series a discrete cosine transform circuit, a quantizer, a variable length coding circuit, a multiplexer, and an output buffer;
   a second prediction channel including in series, between the output of said quantizer and the input of the discrete cosine transform circuit, an inverse quantizer, an inverse cosine transform circuit, an adder, a prediction circuit, and a negative input of a subtracter;
   a third decision channel, including a decision circuit inserted between the output of the buffer and the prediction circuit, for selecting between an intra coding mode and an inter coding mode;
   wherein said decision channel also comprises:
   a down-converter, inserted between an input of the video coding device and a positive input of said subtracter;
   an up-converter, inserted between an output of said inverse cosine transform circuit and an input of the adder;
   wherein the down converter and the up-converter being controlled by said decision circuit in order to be active only if said intra coding mode is selected.

4. A device for decoding a video signal from the video coding device of claim 3, said device comprising:
   a decoding channel including in series a variable length decoding circuit, an inverse quantizing circuit and an inverse discrete cosine transform circuit;
   a motion compensation channel including a picture memory and a motion compensation circuit;
   an adder for receiving outputs from the inverse discrete transform circuit and the motion compensation circuit; and
   a detecting circuit for recognizing the intra coding, and an up-converter, for performing only in the intra coding mode, the conversion from the reduced picture format to the format of the pictures coded according to the inter coding mode.

* * * * *